May 18, 1926.
A. KÉGRESSE
1,585,100
LOAD DISTRIBUTING DEVICE FOR ENDLESS TRACK VEHICLES
Filed April 4, 1925
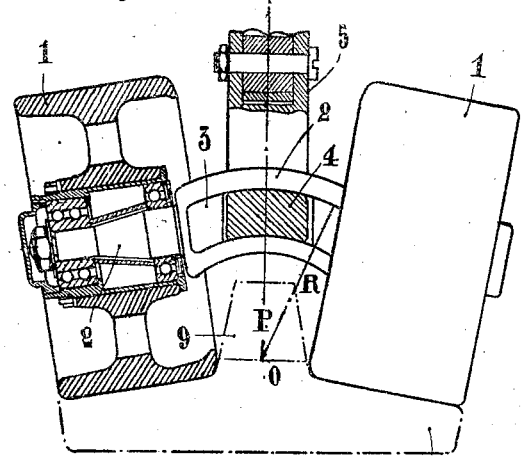
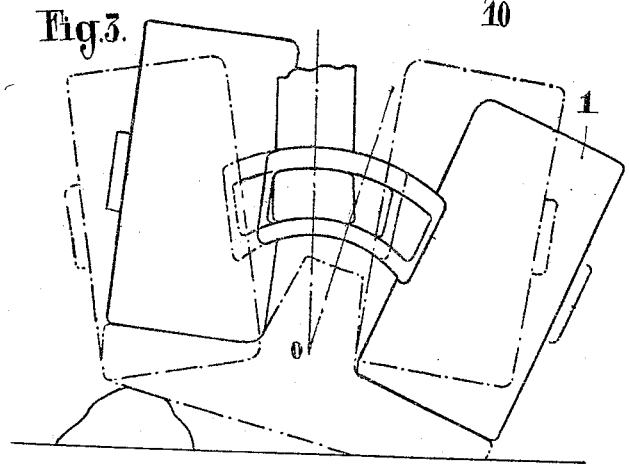
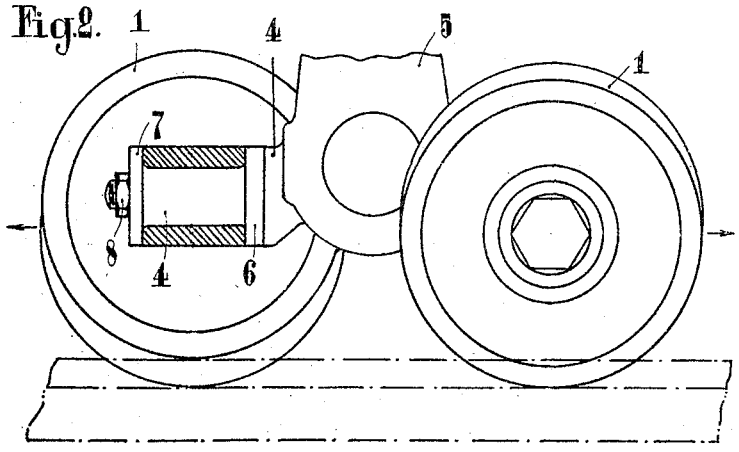
INVENTOR:
Adolphe Kégresse
BY
ATTORNEY Patented May 18, 1926.

1,585,100

UNITED STATES PATENT OFFICE.

ADOLPHE KÉGRESSE, OF PARIS, FRANCE.

LOAD-DISTRIBUTING DEVICE FOR ENDLESS-TRACK VEHICLES.

Application filed April 4, 1925. Serial No. 20,742.

This invention relates to endless-track vehicles, and more particularly to vehicles of the character indicated wherein the track takes the form of an endless flexible belt, the lower stretch of which is pressed against the ground by means of a series of supporting rollers disposed in pairs on opposite sides of an endless median rib or projection provided on the inner surface of the belt; such rib or projection being usually (though not necessarily) split transversely at regular intervals to produce a succession of separate blocks.

The object of the invention is to provide certain improvements in or relating to the mounting of the aforesaid supporting rollers so as to enable an effective distribution of the load and to permit a transverse or lateral rocking of the rollers to take place when the belt is passing over uneven ground in accordance with its irregular surface, but without such rocking causing any objectionable friction action to be set up laterally against the belt rib.

An embodiment of the invention is illustrated in the accompanying drawing, wherein:

Figure 1 is a vertical cross-sectional view, with parts in elevation, of the improved mounting and showing the track belt in dotted lines;

Fig. 2 is a part-sectional side view of Fig. 1; and

Fig. 3 is a diagrammatic view generally similar to Fig. 1, and showing in dotted lines the supporting rollers in Fig. 1 position, and in full lines the position assumed by said rollers on being rocked or swung transversely.

Referring more particularly to the drawing, the supporting rollers 1 are revolubly mounted on the ends of the axle 2, the central part of which is formed with an arcuate slot 3 of a radius R; the center of curvature O of the slot being located at the base of the guide rib 9 (or its component blocks) of the endless flexible track belt 10.

The axle 2 is slidably engaged at each end with a rocking beam 4 which extends transversely through slot 3 and is connected at its center to a vertical member or standard 5 forming part of the carrier frame; the beam ends fitting with a slight upward play in the corresponding slots and being normally disposed in the central portion thereof so that a space is thus left at opposite sides of said ends, as represented in Fig. 1. The axle is held on beam 4 between a shoulder 6 and a thrust plate 7 and nut 8 (Fig. 2), but is allowed a slight play. The arrow in Fig. 2 is intended to indicate the direction of travel of the vehicle.

The operation is substantially as follows: When the vehicle is passing over level ground, the load P is transmitted to axles 2 through beam 4, and the rollers 1 press the belt against the ground for its full width. When, however, the belt has to ride over an obstacle in its path, such as a rock or stone, the roller 1 that has to pass directly over the stone will be lifted up and its axle will slide across the beam 4, the parts then assuming the positions indicated in full lines in Fig. 3. The center of such swinging or rocking movement or displacement being taken as the point O which, as stated, is located at the base of the rib 9 (or its blocks), the entire system comprising the belt and the supporting rollers will always shift or tilt about this point without occasioning any objectionable or dangerous pressure being exerted laterally against the rib. The movement of the axle with relation to the beam is limited by the end walls of the slot, thus preventing excessive lateral wabbling of the rollers.

I claim as my invention:—

1. A load-distributing device for endless flexible track belts of the type comprising an endless median guide rib on the inner surface of the belt, embodying a carrier frame, and supporting rollers bearing upon the lower stretch of the belt and mounted relatively to said frame in such a manner as to enable them to be shifted, in accordance with ground-irregularities, tranversely of the belt in an arcuate path, the center of curvature of which is located at the base of the rib.

2. A load-distributing device for endless flexible track belts of the type comprising an endless median guide rib on the inner surface of the belt, embodying a carrier frame, a rocking beam connected with said frame, an axle having a central arcuate slot through which said beam transversely extends and the center of which is located at the base of the rib, and supporting rollers mounted on the axle ends and bearing upon the lower stretch of the belt; said axle having its slotted portion slidably engaging the beam to enable said rollers to be shifted, in accordance with ground-irregularities, transversely of the belt in an arcuate path the center of curvature of which coincides with that of the slot.

In testimony whereof I affix my signature.

ADOLPHE KÉGRESSE.